F. McCARTHY.
Cotton Gin.
No. 262. Reissued April 18, 1854.
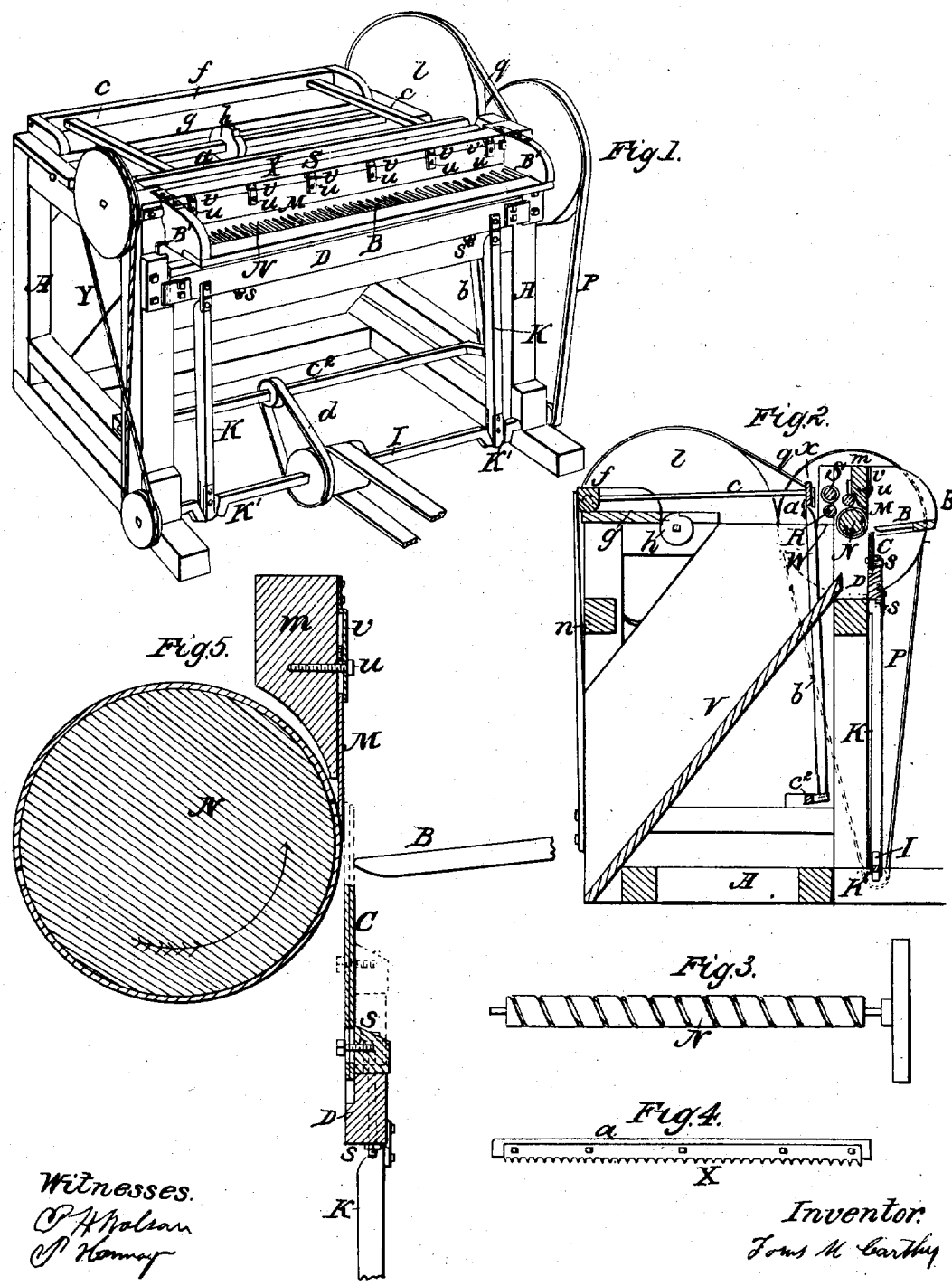
Witnesses.
P. H. Nolan
P. Hennay
Inventor.
Thos. McCarthy

UNITED STATES PATENT OFFICE.

FONES McCARTHY, OF PUTNAM COUNTY, FLORIDA.

IMPROVEMENT IN COTTON-GINS.

Specification forming part of Letters Patent No. 1,675, dated July 3, 1840; Reissue No. 262, dated April 18, 1854.

*To all whom it may concern:*

Be it known that I, FONES McCARTHY, formerly of Demopolis, in the county of Marengo and State of Alabama, now residing in Putnam county, near Orange Springs, in the county of Marion and State of Florida, have invented certain new and useful Improvements in Cotton-Gins, of which the following is a full, clear, and exact description, reference being had to the accompanying drawings of the same, which make part of this specification, and in which—

Figure 1 represents a view in perspective of a cotton-gin embracing my improvements. Fig. 2 repesents a vertical section of the same. Fig. 3 represents a view of the drawing-cylinder detached. Fig. 4 represents a view of the doffing-comb detached; and Fig. 5 represents a sectional view, upon an enlarged scale, of those parts of the machine which effect the separation of the fiber and seeds.

By means of my improved gin cotton with a staple of considerably greater average length and value is produced from any given quantity of cotton than can be produced by any other gin before known. In my gin the fibers are separated from the seed by drawing them by friction against a rough moving surface through a slot which rapidly expands and contracts in width. When opened to the greatest width the slot is wide enough to permit the free entrance of both fiber and seeds; but preparatory to opening wide, one side of the slot is caused to overlap the other to strip the seeds from the fiber and thrust them away, so that they may not enter the slot while it expands to admit the fiber, and before it again contracts to strip and push off the seeds. In this way the fiber is rapidly and completely separated from the seeds and deposited by itself on the opposite side of the slot, whence it was taken.

The machine consists of a strong frame, A, to support the working parts. These consist, principally, of a hopper to receive the seed or unginned cotton and feed it as required to that part of the mechanism which separates the seeds from the fibers. The bottom B of this hopper resembles a comb, with the teeth slightly declining from the horizontal toward the points. The spaces between the teeth are wide enough for the seeds of the cotton, motes, and other impurities to drop through. The back of the hopper is formed by a breast-plate, M, and the ends B′ by boards, plates, or the projecting ends of two of the upper pieces of the frame. The breast-plate M, which, as before stated, forms the back of the hopper, is attached by screws *u* and clamp-plates *v* to a cross-bar, *m*, of the frame. The screws pass through vertical slots in the plate, which allow it to be adjusted up or down to set its lower edge at a greater or less distance from the surface of a drawing-roll, for a purpose which will be hereinafter described. Parallel with the breast-plate M, but in a lower position, another plate, which I call the "stripping-plate" C, is secured to a stock having a reciprocating motion in a plane parallel to the front side of the breast-plate. The stripping-plate is attached to its stock by screws or otherwise at the height required for ginning cotton of the length and strength of staple it is intended to operate on, so that the upper edge of the stripping-plate will overlap the lower edge of the breast-plate, when it is at the upper extremity of its stroke, a distance corresponding to the length and tenacity of the fiber. The stripping-plate is also adjustable transversely by moving that portion of the stock to which it is attached, which for this purpose is connected to the lower or main part of the stock by screw-bolts *s*, the adjustable piece having transverse slots, which are of a length equal to the greatest lateral movement it is ever required to give to the stripping-plate for the purpose of adjustment. The stripping-plate should not be set so near the breast-plate that their edges in passing would cut the fiber like shears, and, on the other hand, care must be taken not to set the stripping-plate so that it will pass the breast-plate at too great a distance, lest cotton-seeds should pass between them without being detached from the fiber and pushed back, the object being to draw the fiber through a narrow slot or space between these plates, from which the seeds are excluded, and thus separate the two. The upper edge of the stripping-plate works best when straight, although during some of my early experiments on specimens of partially-cleaned cotton for warehouses, I was led to replace the straight by a serrated edge, which works remarkably well, but not quite as well as the straight-edge. When a stripping-plate with a serrated edge is used, it works much the best by combining it with another plate having a straight edge, the two being clamped together in such manner that the serrated edge will be at the same height with the smooth edge. The reciprocating movement is given to the stripping-plate by connecting the stock D, which runs in suitable guides in the frame, or is governed in its motion by radius-bars by means of link-rods K with cranks K′ on a shaft, I, beneath which is turned by motion derived from any suitable prime mover, and being in this instance made the main driving-shaft of the gin it transmits motion to the other parts of the machine from suitable pulleys which it carries.

The means employed for drawing the fiber through the contracting and expanding slot or opening between the breast and stripping-plates is the surface of a revolving roll or cylinder, roughened by a covering of strips of leather wound round it spirally in such manner that the joint between the adjacent turns of the spiral strips shall form a groove to receive small particles of hard substances that occasionally pass with the fiber of the cotton through the slot. The periphery of the roll is arranged in such a position that the plane in which the breast-plate stands shall coincide with the tangent of its front side, so that by moving the breast-plate downward its lower edge may be made to bear upon the roll, and by moving it up again the edge of the plate may be adjusted at any required distance from the roll. The rough leather surface of the roll as it turns in the direction indicated by the arrow seizes the fibers of the cotton that come in contact with it, when the stripper descends to expand the slot, and the friction is sufficient to carry the ends of the fiber beneath the edge of the breast-plate, which, pressing the fiber firmly against the roll, the former adheres to the latter so firmly that it is carried forward with force sufficient to resist the action of the stripper in pushing off the seed. The velocity with which the drawing-roll revolves should be such that while the stripping-plate moves up and down once the surface of the roll will move a distance rather less than that which the upper edge of the stripping-plate overlaps the lower edge of the breast-plate, in order that there may at all times be rather more fiber stripped of its seed than can be drawn through the opening by the roll while the slot is expanded. This prevents the seeds from being drawn into the opening and crushed, or otherwise obstructing the work. In case the fiber is very long and strong, the speed of the drawing-roll may be increased beyond the rate I have mentioned relative to the overlapping of the stripper. The drawing-roll N derives its motion from the crank-shaft I by the belt P, which encircles pulleys on the crank and drawing-roll shafts, as represented in the drawings. After the fiber has been drawn out from the seed by the roll it may be brushed off and discharged in a flocculent mass into a proper receptacle; or it may be taken up by a supplementary pair of suitable rolls, and doffed in rovings like wool from a carding-machine. By delivering the fiber in the last-named form its appearance is much improved without, however, enhancing its intrinsic valve. Therefore, although I have constructed this supplementary apparatus, and represented it in the drawings, I do not propose to use it, as the gin, as such, is complete without it. I have sometimes used a small roll, R, arranged to run upon the drawing-roll, and pressing by its own weight upon the fiber to increase its adhesion to the leather; but as this roll is not found necessary I shall omit any detailed description of it.

I do not deem it necessary to describe the supplementary apparatus for delivering the cotton in rovings, further than to say that it consists of a receiving-roll, *s*, round which the cotton winds on leaving the drawing-roll; a pressing roll, *w*; a doffing-comb, *x*, to detach the cotton in rovings from the receiving-roll *s*, which derives a vertical reciprocating motion from a crank-shaft, $c^2$, through link-rods *b*, and simultaneously therewith a horizontal reciprocating motion, to bring the comb at proper intervals into contact with the receiving-roll *s*, to doff the fiber therefrom by means of a cam, *h*, to hold the comb for a certain period off the roll, and then permit it at the proper time to approach the same; a spring, *n*, to force the comb toward the roll the instant the cam releases it, the stock *a* of the comb being connected to the cam and spring by the link-rods *c* and sliding stock *f g*. This cam is revolved by motion derived, through the pulley *l* and belt *q*, from a pulley on the shaft of the drawing-roll N. The crank-shaft $c^2$ derives motion from the main crank-shaft T through the belt *d*, which encircles suitable pulleys mounted on the two shafts.

The operation of this machine without the apparatus for forming the cotton into rovings is as follows: Motion being given to the crank-shaft, and a quantity of cotton in the seed being placed in the hopper, the declination of the bottom of which tends to cause the cotton to bear against the breast-plate, so that when the stripping-plate descends the fibers lie against the surface of the roll, and are drawn beneath the edge of the breast-plate. As the stripping-plate rises again it meets the fiber crossing through to the drawing-roll, and, raising it up, bends it over the edge and against the side of the breast-plate, stripping off and pushing back the seeds a distance equal to that which the stripper overlaps the breast-plate. When the plate descends, the portion of the fiber that has just been freed from seeds is drawn by the roll through the opening and under the breast-plate, presenting another length ready to be cleaned of seeds by the stripping-plate, as before. As the friction between the fibers and the leather surface of the drawing-roll is sufficient to resist the force required for detaching the seed from the fiber, the seed is stripped off with great rapidity and certainty. When the seeds are stripped off they fall down between the bars of the bottom of the hopper, or through the space between the stripping-plate and the ends of the bars of the bottom. The cotton drawn out of the hopper by the roll N is discharged behind in a continuous sheet upon an inclined apron, Y, which conducts it to any convenient receptacle. Sometimes a brush is placed behind the drawing-roll to scrape off or detach from the leather any adherent fiber; but this or any other of the devices in common use for detaching fiber from a roller may be employed at the option of the constructor of the machine.

In case gravel or a piece of hard wood or metal should chance to get between the lower edge of the breast-plate and the drawing-roll, it is prevented from forming a crease round the leather that might permanently injure it, and is itself discharged by dropping into one of the spiral channels between the strips of leather with which the roll is wound. When the roll turns over, the piece thus caught in the channel is discharged into the space beneath the roll among the motes and other impurities detached from the cotton during the operation.

Having thus described my improved cotton-gin, what I claim therein as my invention, and desire to secure by Letters Patent, is—

The combination of a stripping-plate, breast-plate, and drawing-roll, substantially as herein set forth.

FONES McCARTHY.

Witnesses:
P. H. WATSON,
P. HANNAY.